(12) United States Patent
Wang

(10) Patent No.: US 7,323,837 B2
(45) Date of Patent: Jan. 29, 2008

(54) FAN SPEED CONTROLLING SYSTEM

(75) Inventor: Ning-Yu Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/308,942

(22) Filed: May 29, 2006

(65) Prior Publication Data
US 2007/0120510 A1   May 31, 2007

(30) Foreign Application Priority Data
Nov. 29, 2005   (CN) .................. 2005 2 0119591 U

(51) Int. Cl.
*H02P 1/00* (2006.01)

(52) U.S. Cl. ...................... 318/268; 318/254; 318/138; 318/439; 318/471

(58) Field of Classification Search ................ 318/268, 318/254, 138, 439, 471; 454/184; 361/687; 395/750; 364/273.1; 388/934
See application file for complete search history.

(56) References Cited

U.S. PATENT DOCUMENTS

| | | | |
|---|---|---|---|
| 4,136,822 A * | 1/1979 | Felter | 236/49.1 |
| 5,769,705 A * | 6/1998 | O'Callaghan et al. | 454/184 |
| 6,247,898 B1 | 6/2001 | Henderson et al. | |
| 2005/0037256 A1* | 2/2005 | Mukainakano | 429/61 |

* cited by examiner

*Primary Examiner*—Karen Masih
(74) *Attorney, Agent, or Firm*—Wei Te Chung

(57) ABSTRACT

A fan speed controlling system for a power supply comprises a fan having two pins and a voltage comparator connected to the fan. The voltage comparator comprises a first input terminal for receiving a first reference voltage controlled by an external temperature of the power supply and a second input terminal for receiving a second reference voltage controlled by an interior temperature of the power supply. The voltage comparator outputs a higher voltage of the first and second reference voltage to the fan via the two pins.

17 Claims, 1 Drawing Sheet

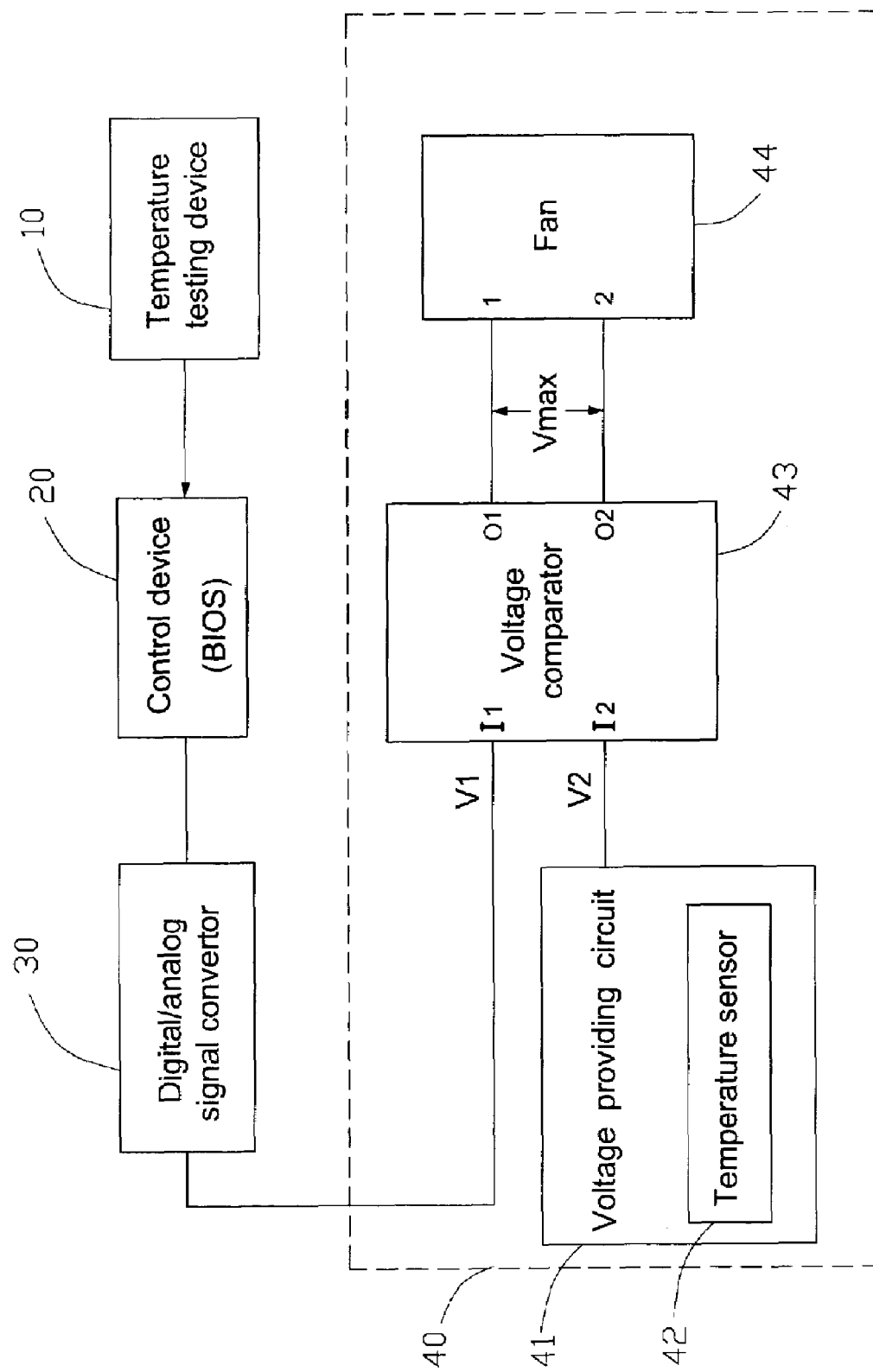

FAN SPEED CONTROLLING SYSTEM

FIELD OF THE INVENTION

The present invention relates to fan speed controlling systems, more particularly to a fan speed controlling system for a power supply of a computer.

DESCRIPTION OF RELATED ART

Computer systems generally include a power supply for providing voltage to the components in the computer. A fan is typically used with power supplies for preventing temperatures in the computer systems from becoming too high. Generally, the faster the fan speed is, the better a cooling effect is. However, fan speed greater than needed adds unnecessary noise to the environment and wastes energy. So, it is necessary to control the fan speed.

A conventional fan speed control method is using a two pins fan. The fan is connected to a voltage providing circuit providing a variable voltage according to the interior temperature of the power supply. When the temperature becomes higher, the voltage provided to the fan becomes higher too, and the fan rotates faster. When the temperature becomes lower, the voltage provided to the fan becomes lower too, and the fan speed becomes lower. However, the two pins fan is only able to adjust the fan speed according to the interior temperature of the power supply and not the exterior of the power supply. So, a four-pin pulse width modulation (PWM) fan is used in the industry. The PWM fan includes a fan speed testing circuit and a pulse width controlling circuit. The PWM fan speed can be controlled by both the interior and external temperature of the power supply. However, the PWM fan is of a complicated configuration and adds to the cost of manufacturing.

What is needed, therefore, is a fan speed controlling system of a less complicated nature wherein the fan speed can be controlled according to both the interior and external temperatures of the power supply.

SUMMARY OF THE INVENTION

A fan speed controlling system for a power supply comprises a fan having two pins and a voltage comparator connected to the fan. The voltage comparator comprises a first input terminal for receiving a first reference voltage controlled by an external temperature of the power supply and a second input terminal for receiving a second reference voltage controlled by an interior temperature of the power supply. The voltage comparator outputs a higher voltage of the first and second reference voltages to the fan via the two pins.

Other advantages and novel features will be drawn from the following detailed description of preferred embodiments with attached drawings, in which:

BRIEF DESCRIPTION OF THE DRAWINGS

The drawing is a schematic diagram of a fan speed controlling system in accordance with a preferred embodiment of the present invention;

DETAILED DESCRIPTION OF THE INVENTION

Referring to the drawing, a fan speed controlling system in accordance with a preferred embodiment of the present invention, includes a temperature testing device 10, a controlling device 20 (such as a BIOS of a computer), a digital/analog signal converter 30, and a power supply 40. The power supply 40 includes a voltage comparator 43 and a functional component like a fan 44.

The temperature testing device 10 tests a temperature of the computer system and simultaneously outputs a temperature signal to the controlling device 20.

The controlling device 20 receives the temperature signal from the temperature testing device 10 and outputs a corresponding variable digital control signal. The higher the temperature of the computer system is, the stronger the digital control signal is.

The digital/analog signal converter 30 is connected to the controlling device 20 for receiving the variable digital control signal and transforming it to a variable first reference voltage V1. The stronger the control signal is, the higher the first reference voltage V1 is.

The power supply 40 includes a voltage providing circuit 41 producing a variable second reference voltage V2 according to the temperature in the power supply 40, the voltage comparator 43, and the fan 44. The voltage providing circuit 41 further includes a temperature sensor 42 for adjusting the second reference voltage V2. When the interior temperature of the power supply 40 goes up, the resistance of the temperature sensor 42 goes down, and thus the second reference voltage V2 produced by the voltage providing circuit 41 goes up as well. Therefore, it follows that when the interior temperature goes down, the resistance goes up, and the voltage V2 becomes lower.

The voltage comparator 43 includes a first input pin I1 for receiving the first reference voltage V1 output by the digital/analog signal converter 30 and a second input pin I2 for receiving the second reference voltage V2 output by the voltage providing circuit 41. The voltage comparator 43 also includes a first output terminal O1 and a second output terminal O2. The voltage from the second output terminal O2 is zero. The voltage output from the first output terminal O1 is the greater between the first and second reference voltage. That is, when the first reference voltage is higher than the second reference voltage, the voltage difference Vmax between the first output terminal O1 and the second output terminal O2 is equal to the first reference voltage V1; when the first reference voltage is lower than the second reference voltage, the voltage difference Vmax between the first output terminal O1 and the second output terminal O2 is equal to the second reference voltage V2.

The fan 44 includes a first pin 1 connected to the first output terminal O1 of the voltage comparator 43 and a second pin 2 connected to the second output terminal O2 of the voltage comparator 43. The rotating speed of the fan 44 is always controlled by the higher of the voltages between the first reference voltage V1 and the second reference voltage V2. Thus, the fan is maintained at an appropriate speed according to the greater of the temperatures of the interior and exterior of the power supply 40.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fan speed controlling system for a power supply used in a computer, comprising:
   a fan having two pins and disposed in the power supply; and
   a voltage comparator disposed in the power supply connected to the fan, the voltage comparator comprising a first input terminal receiving a first reference voltage controlled by an external temperature of the power supply in the computer and a second input terminal receiving a second reference voltage controlled by an interior temperature of the power supply;
   wherein the voltage comparator compares the first reference voltage and the second reference voltage and outputs a higher voltage of the first and second reference voltages to the fan via the two pins, thereby controlling the fan to always run in a higher speed.

2. The fan speed controlling system for a power supply as described in claim 1, further comprising a temperature testing device for testing the external temperature of the power supply in the computer and outputting a temperature signal determining the first reference voltage.

3. The fan speed controlling system for a power supply as described in claim 2, further comprising a controlling device connected between the temperature testing device and the voltage comparator for outputting a control signal according to the temperature signal from the temperature testing device.

4. The fan speed controlling system for a power supply as described in claim 3, further comprising a digital/analog signal converter connected between the controlling device and the voltage comparator for transforming the control signal from the controlling device into the first reference voltage.

5. The fan speed controlling system for a power supply as described in claim 1, wherein the first reference voltage varies in direct proportion to the external temperature of the power supply in the computer.

6. The fan speed controlling system for a power supply as described in claim 1, wherein the second reference voltage varies in direct proportion to the interior temperature of the power supply.

7. The fan speed controlling system for a power supply as described in claim 1, further comprising a voltage providing circuit producing the second reference voltage.

8. The fan speed controlling system for a power supply as described in claim 7, wherein the voltage providing circuit further comprises a temperature sensor for controlling the voltage providing circuit to output the second reference voltage.

9. The fan speed controlling system for a power supply as described in claim 8, wherein the controlling device is a BIOS chip in the computer.

10. A fan speed controlling system for a computer, comprising:
    a controlling device outputting a variable digital control signal according to the temperature in the computer;
    a digital/analog signal converter for transforming the variable digital control signal into a variable first reference voltage; and
    a power supply comprising a voltage providing circuit producing a variable second reference voltage, a voltage comparator and a fan having two pins connected to the voltage comparator, the voltage comparator comprising a first input terminal for receiving the first reference voltage controlled by the temperature of the computer system and a second input terminal for receiving the second reference voltage controlled by the interior temperature of the power supply, the voltage comparator outputting a higher voltage of the first and second reference voltages to the fan via the two pins.

11. The fan speed controlling system for a computer as described in claim 10, wherein the first reference voltage varies in direct proportion to the external temperature of the power supply in the computer.

12. The fan speed controlling system for a computer as described in claim 10, wherein the second reference voltage varies in direct proportion to the interior temperature of the power supply.

13. The fan speed controlling system for a computer as described in claim 10, further comprising a temperature sensor for controlling the voltage providing circuit to output the second reference voltage.

14. The fan speed controlling system for a computer as described in claim 10, wherein the voltage comparator further comprises two output terminals respectively connected to the two pins of the fan, one of the output terminals outputting the higher voltage of the first and second reference voltages to the fan via the corresponding pin, and the other terminal and pin are connected to a zero voltage.

15. A computer system comprising:
    a functional component of said system functioning in response to voltage signals transmitted to said component for removing heat in said computer system;
    a first voltage signal source providing first voltage signals based on tested temperature of said system;
    a second voltage signal source providing second voltage signals based on sensed temperature of said component; and
    a voltage comparator electrically connecting between said component and said first and second voltage signal sources, said comparator receiving said first and second voltage signals from said first and second voltage signal sources respectively, and transmitting a higher voltage of said first and second voltage signals to said component for functioning.

16. The computer system as described in claim 15, wherein said higher voltage of said first and second voltage signals is transmitted to said component through two output pins of said comparator, and voltage difference output by said two pins is equal to a voltage value of said higher voltage of said first and second voltage signals.

17. The computer system as described in claim 15, wherein said first voltage signal source further comprises a controlling device for outputting a variable digital control signal according to said tested temperature of said system, and a digital/analog signal converter for transforming said variable digital control signal into said first voltage signals.

* * * * *